United States Patent

Pinnau et al.

[11] Patent Number: 5,707,423
[45] Date of Patent: Jan. 13, 1998

[54] SUBSTITUTED POLYACETYLENE SEPARATION MEMBRANE

[75] Inventors: Ingo Pinnau, Palo Alto, Calif.; Atsushi Morisato, Tokyo, Japan

[73] Assignee: Membrane Technology and Research, Inc., Menlo Park, Calif.

[21] Appl. No.: 663,906

[22] Filed: Jun. 14, 1996

[51] Int. Cl.[6] .................................................. B01D 53/22
[52] U.S. Cl. ........................ 95/45; 95/50; 95/54; 96/4; 96/12
[58] Field of Search ............................. 95/45, 47–55; 96/4, 7, 8, 10, 12, 13

[56] References Cited

U.S. PATENT DOCUMENTS

| | | | |
|---|---|---|---|
| 4,230,463 | 10/1980 | Hemis et al. | 96/12 X |
| 4,444,970 | 4/1984 | Weddigen | 526/285 |
| 4,567,245 | 1/1986 | Takamizawa et al. | 526/279 |
| 4,591,440 | 5/1986 | Higashimura et al. | 210/640 |
| 4,657,564 | 4/1987 | Langsam | 55/16 |
| 4,714,481 | 12/1987 | Matsuura et al. | 96/14 X |
| 4,746,334 | 5/1988 | Matsui et al. | 55/158 |
| 4,755,193 | 7/1988 | Higashimura et al. | 55/16 |
| 4,759,776 | 7/1988 | Langsam et al. | 55/16 |
| 4,859,215 | 8/1989 | Langsam et al. | 96/4 X |
| 4,871,378 | 10/1989 | Pinnau | 96/13 X |
| 4,968,470 | 11/1990 | Lynch et al. | 264/177.14 |
| 4,990,255 | 2/1991 | Blume et al. | 96/13 X |
| 5,049,167 | 9/1991 | Castro et al. | 96/13 X |
| 5,073,175 | 12/1991 | Anand et al. | 96/13 X |
| 5,085,776 | 2/1992 | Blume et al. | 96/13 X |
| 5,176,724 | 1/1993 | Saito et al. | 96/13 |
| 5,281,255 | 1/1994 | Toy et al. | 95/50 |
| 5,501,722 | 3/1996 | Toy et al. | 95/50 |

FOREIGN PATENT DOCUMENTS

| | | | |
|---|---|---|---|
| 0361628 | 4/1990 | European Pat. Off. | 96/12 |
| 57-001405 | 1/1982 | Japan | 96/4 |
| 58-223405 | 12/1983 | Japan | 96/4 |
| 58-223406 | 12/1983 | Japan | 96/4 |
| 58-223407 | 12/1983 | Japan | 96/4 |
| 58-223408 | 12/1983 | Japan | 96/4 |
| 58-223409 | 12/1983 | Japan | 96/4 |
| 59-042004 | 3/1984 | Japan | 96/4 |
| 60-212414 | 10/1985 | Japan | . |
| 61-015718 | 1/1986 | Japan | 96/12 |
| 61-035823 | 2/1986 | Japan | 96/14 |
| 61-146321 | 7/1986 | Japan | 96/13 |
| 61-192322 | 8/1986 | Japan | 96/13 |
| 62-033526 | 2/1987 | Japan | 96/14 |
| 62-079831 | 4/1987 | Japan | 96/13 |
| 62-110729 | 5/1987 | Japan | 96/13 |
| 62-262725 | 11/1987 | Japan | . |
| 62-286518 | 12/1987 | Japan | 96/13 |
| 63-056531 | 3/1988 | Japan | 96/14 |
| 63-214319 | 9/1988 | Japan | 96/13 |
| 63-274432 | 11/1988 | Japan | 96/4 |
| 1-090016 | 4/1989 | Japan | 96/14 |
| 1-123619 | 5/1989 | Japan | 96/13 |
| 2-218415 | 8/1990 | Japan | 96/13 |
| 4-145933 | 5/1992 | Japan | 96/4 |

OTHER PUBLICATIONS

Masuda et al. "Polymerization of Methylpentynes by Transition Metal Catalysts," Polymer Journal, vol. 14, No. 5, pp. 371–377 (1982).

Masuda et al, "Polyacetylenes with Substituents: Their Synthesis and Properties", Advances in Polymer Science 81, 1987, pp. 124–148.

Takada et al. "Gas Permeability of Polyacetylenes Carrying Substituents," J. App. Polymer Sci., vol. 30, pp. 1605–1616 (1985).

*Primary Examiner*—Robert Spitzer
*Attorney, Agent, or Firm*—J. Farrant

[57] ABSTRACT

A separation membrane useful for gas separation, particularly separation of $C_{2+}$ hydrocarbons from natural gas. The invention encompasses the membrane itself, methods of making it and processes for using it. The membrane comprises a polymer having repeating units of a hydrocarbon-based, disubstituted polyacetylene, having the general formula:

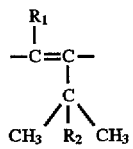

wherein $R_1$ is chosen from the group consisting of $C_1$–$C_4$ alkyl and phenyl, and wherein $R_2$ is chosen from the group consisting of hydrogen and phenyl. In the most preferred embodiment, the membrane comprises poly(4-methyl-2-pentyne) [PMP]. The membrane exhibits good chemical resistance and has super-glassy properties with regard to separating certain large, condensable permeant species from smaller, less-condensable permeant species. The membranes may also be useful in other fluid separations.

35 Claims, 4 Drawing Sheets

SUBSTITUTED POLYACETYLENE SEPARATION MEMBRANE

This invention was made with Government support under Contract Number DE-FG03-94ER81811, awarded by the Department of Energy. The Government has certain rights in this invention.

FIELD OF THE INVENTION

The invention relates to separation membranes. In particular, the invention relates to membranes for gas separation.

BACKGROUND OF THE INVENTION

Separation membranes are in use in many fields, such as gas separation, pervaporation, ultrafiltration, reverse osmosis, dialysis and electrodialysis.

The optimum separation membrane combines high selectivity with high flux. Thus the membrane industry has engaged in an ongoing quest for membranes with improved flux/selectivity performance. Gas separation is a particularly active research area.

In recent years, some glassy polymer materials with extremely high gas permeabilities have been synthesized and formed into membranes. The best known and most studied of these is poly(1-trimethylsilyl-1-propyne) [PTMSP], a substituted polyacetylene.

PTMSP has been found to exhibit anomalous properties for a glassy material, in that PTMSP membranes are more permeable to larger, more condensable molecules than to smaller, less condensable molecules. Also, they have higher mixed gas selectivity than pure gas selectivity for at least some gas pairs. These previously unexpected properties were made use of in U.S. Pat. No. 5,281,255, for example. PTMSP has become known as a "super-glassy" material, in part because of the unusual combination of permeability and selectivity properties.

It is not possible to predict with any accuracy from the structure of a polymer whether or not it will exhibit super-glassy properties. To date, PTMSP is the only such material that has been studied to any extent. We believe that certain substituted acetylenes, including PTMSP, may exhibit super-glassy properties because the bulky side groups prevent close packing of the polymer chains and give rise to a large free volume within the polymer material itself. We further believe that it is this large free-volume that in some circumstances might give rise to selectivity in favor of condensable molecules.

However, being a substituted acetylene is neither a sufficient nor a necessary condition for super-glassy behavior. Many substituted acetylenes have been made, and almost limitless numbers can readily be conceived. A review article by Masuda et al. entitled "Polyacetylenes with Substituents: Their Synthesis and Properties", (*Advances in Polymer Science*, 81, Springer-Verlag, 1987) gives an overview of techniques for preparing a variety of substituted polyacetylenes, and reports a variety of results, spanning a wide range of yields and resulting molecular weights. The polymers that were successfully made have diverse physical properties. The article reports gas permeation properties for 14 substituted polyacetylenes. The oxygen permeabilities range from 7.5 Barrer for poly(1-phenyl-1-propyne) (a polymer with methyl and phenyl side groups) to 6,100 Barrer for PTMSP.

As has been outlined above and can be seen clearly from the article, understanding of substituted acetylenes has not reached the point where it is possible to predict properties from structure.

Among the hydrocarbon polyacetylenes, the Masuda et al. article, page 135, mentions 4-methyl-2-pentyne, and states that this monomer can be polymerized with $NbCl_5$, but does not provide a teaching for so doing. The article estimates that the molecular weight of the polymer is at least $1 \times 10^5$. However, another paper by Masuda et al. ("Polymerization of Methylpentynes by Transition Metal Catalysts: Monomer Structure, Reactivity, and Polymer Properties", Polymer Journal, Vol. 14, No. 5, pp 371–377, 1982), which discusses polymerization of 4-methyl-2-pentyne in detail, states that the polymer molecular weight was about $1 \times 10^4$ or less. A material of this low molecular weight is not suitable for forming membranes; no gas permeation measurements for the polymer are known to have been made or reported, and the material has never, to our knowledge, been used to make films or membranes. Thus, the permeation properties, as well as most other physical properties, have remained unknown.

SUMMARY OF THE INVENTION

The invention is a separation membrane. We believe the membrane is most useful for gas separation. The invention also encompasses methods of making and processes for using the membrane. The membrane comprises a polymer having repeating units of a hydrocarbon-based, disubstituted polyacetylene, having the general formula:

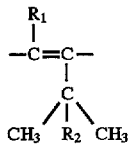

wherein $R_1$ is chosen from the group consisting of $C_1$–$C_4$ alkyl and phenyl, and wherein $R_2$ is chosen independently from the group consisting of hydrogen and phenyl.

In the most preferred embodiment, $R_1$ is methyl and $R_2$ is hydrogen. The membrane then comprises poly(4-methyl-2-pentyne) [PMP], which has repeating units of the structure:

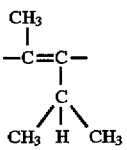

We have discovered that these glassy polymers can be prepared in high enough molecular weight forms for the preparation of membrane films. With regard to other physical properties, we have determined that the polymers have a )urge fractional free volume of at least about 0.2. We have further determined that they are highly chemically resistant, being insoluble in many common organic solvents, such as aromatic hydrocarbons. This chemical resistance is one aspect that differentiates the polymers used in the invention from some other substituted polyacetylenes, such as PTMSP, and gives the membranes of the invention particular advantages for certain uses.

We have further discovered that membranes formed from the polymers exhibit very high gas permeabilities for many gases. Yet further, we have discovered that the membranes behave, in some instances at least, as super-glassy membranes; that is, they manifest what appears to be blocking by large permeant species of smaller permeant species.

This combination of physical attributes of the polymers, and of the membranes made therefrom, renders them useful in various ways for gas-separation purposes. Thus, in another aspect, the invention is a gas-separation process using membranes comprising the above-defined polymer. The membranes are believed to be particularly useful for the separation of condensable organic compounds from less condensable organic or inorganic compounds, or from multicomponent gas streams, such as natural gas.

In yet other aspects, the membranes are also believed to be useful in pervaporation.

The membranes of the invention may be made by solution casting or coating, or any other convenient method, and may be made as unsupported films, integral asymmetric membranes, composite membranes, or any other suitable structure. The membranes may be prepared in any form, such as flat sheet, hollow fiber, tubular or other, and may be housed in any appropriate type of module, such as plate-and-frame, potted fiber, or spiral-wound.

The polymer is particularly preferred for use in the selective layer of the membrane, that is the layer that is primarily responsible for the separation properties. However, the unusually high permeability means that membranes in which the polymer materials comprise a microporous support layer, a sealing layer, or a gutter layer are also useful in diverse separation applications.

The membranes may include copolymers of PMP with other materials, such as, but not necessarily, other substituted acetylenes. The membranes may be subjected to other treatments that modify the polymer, such as crosslinking or surface fluorination.

It is an object of the invention to provide new polymer materials for the membrane-making art.

It is an object of the invention to provide highly permeable membrane materials.

It is an object of the invention to provide a membrane combining high flux and useful selectivity for a number of gases.

It is an object of the invention to provide membranes and processes useful for separating or enriching a gas from a fluid mixture.

It is an object of the invention to provide membranes and processes for separating a component from a fluid mixture.

It is an object of the invention to provide membranes and processes for natural gas liquids (NGL) recovery.

Additional objects and advantages will be apparent from the description of the invention to those skilled in the art.

It is to be understood that the above summary and the following detailed description are intended to explain and illustrate the invention without restricting its scope.

DETAILED DESCRIPTION OF THE INVENTION

Figure 1:
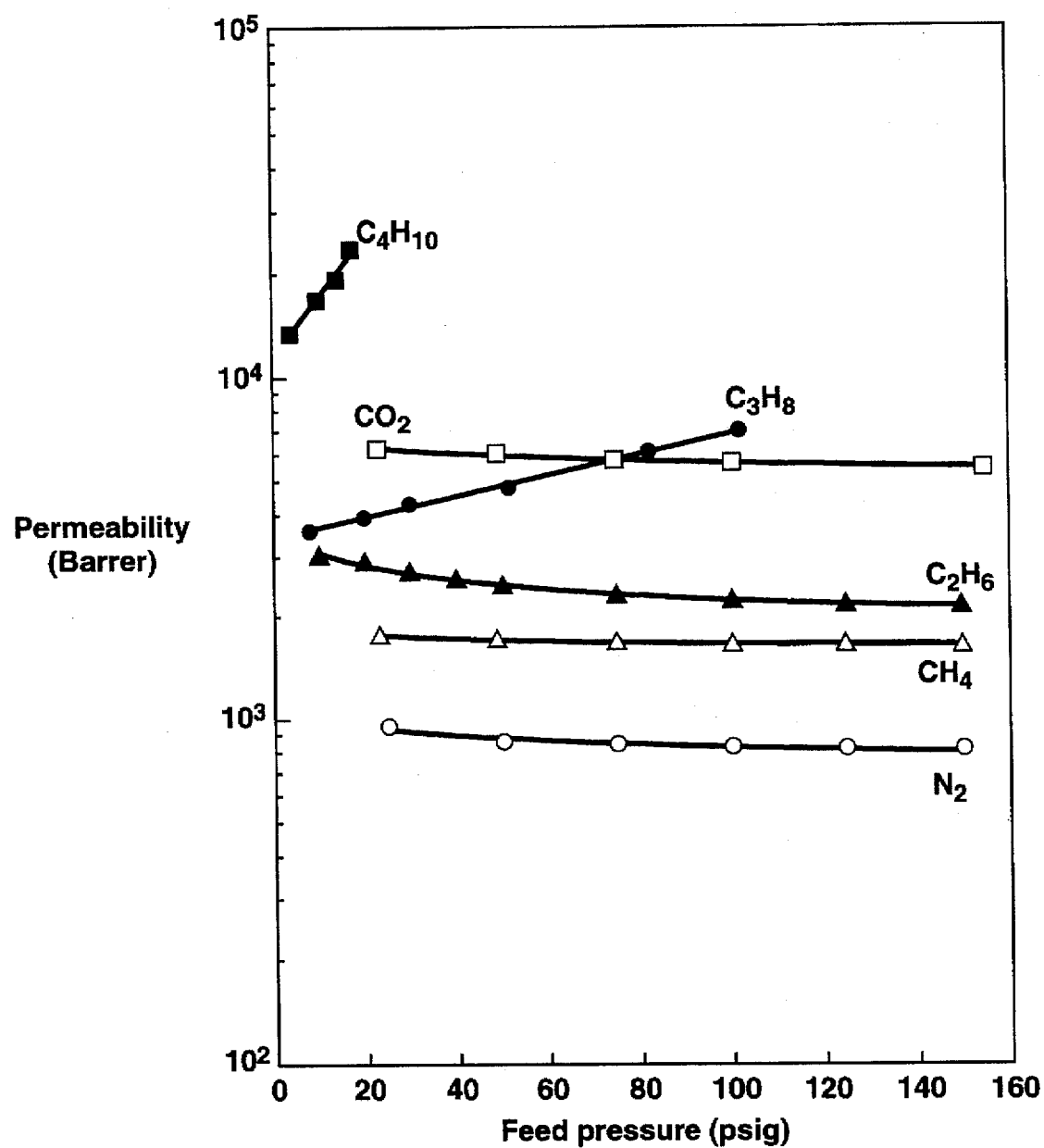
FIG. 1 is a graph of permeability of PMP to various gases as a function of feed pressure.

The term gas as used herein means a gas or a vapor.
The term fluid as used herein means a gas, vapor or liquid.

The term $C_{2+}$ hydrocarbon means a straight- or branched-chain hydrocarbon having at least two carbon atoms.

The terms ideal selectivity and pure gas selectivity as used herein mean the selectivity for one material over another as calculated from permeation measurements with the components singly.

The term substituted acetylene as used herein means a molecule of acetylene, that is $C_2H_2$, in which at least one of the hydrogen atoms has been replaced by another atom or group of atoms.

The term substituted polyacetylene as used herein means a polymer having repeating units of a substituted acetylene.

In its first aspect, the invention is a membrane useful for gas, vapor, and liquid separations. The membrane comprises a polymer having repeating units of a hydrocarbon-based, disubstituted polyacetylene, having the general formula:

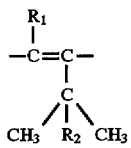

wherein $R_1$ is chosen from the group consisting of $C_1$–$C_4$ alkyl and phenyl, and wherein $R_2$ is chosen independently from the group consisting of hydrogen and phenyl.

In the most preferred embodiment, the membrane comprises poly(4-methyl-2-pentyne) [PMP], which has repeating units of the structure:

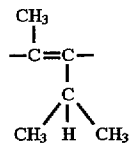

This is not a new polymer in itself. In fact, synthesis of this material was first reported by Masuda et al. fifteen years ago. However, the polymerization process used by Masuda et al. at that time yielded a polymer of molecular weight about $1 \times 10^4$ or lower. The material was recovered in the form of a white powder. A material of this low molecular weight is not suitable for forming high-performance separation membranes, and we are not aware of any reports of attempts to make films from it.

However, we found that polymer of a high enough molecular weight to form substantially defect-free films can be prepared. This can be done by modifying the known procedures for polymerizing substituted acetylenes, such as are described, for example, in T. Masuda et at., "Polyacetylenes with Substituents: Their Synthesis and Properties", (*Advances in Polymer Science*, Vol. 81, Springer-Verlag, 1987) or in Masuda et al. "Polymerization of Methylpentynes by Transition Metal Catalysts: Monomer Structure, Reactivity, and Polymer Properties" (*Polymer Journal*, Vol. 14, No. 5, pp 371–377, 1982). By a high enough molecular weight, we mean a molecular weight of at least about $10^5$, more preferably at least about $10^6$.

The monomers are commercially available from Lancaster Synthesis Co., of Windham, N.J. To prepare the polymers used in the invention from the monomer, we prefer to use co-catalysts of a transition metal chloride and an organometallic compound containing a group 4 or 5 main-group metal, as taught by Masuda et al.

We found that a higher molecular weight product can be achieved by using catalyst concentrations above 30 mmol and by carrying out the reaction at temperatures above 60° C., such as 70° C., 80° C., 90° C. or above. Our preferred transition metal chloride catalysts are tantalum pentachloride ($TaCl_5$) and niobium pentachloride ($NbCl_5$). Our preferred organometallic catalysts are tetraphenyl tin ($Ph_4Sn$) and triphenyl bismuth ($Ph_3Bi$). Our most preferred procedure is to use a co-catalyst solution of 40 mmol each of $NbCl_5$ and $Ph_3Bi$, and to carry out the polymerization reaction at 90° C. Under these conditions, we have found that polymerization occurs rapidly and that a polymerization time of one hour or less suffices to produce a good yield of polymer. However, depending on the specific monomer, catalysts and operating conditions, polymerization times in the range of a few minutes to 24 hours or more may be found to produce the best results.

We have also found that polymers of sufficiently high molecular weight for good membrane formation can be made using only the transition metal chloride catalyst.

Polymerization carried out according to our teachings results in a material of molecular weight of at least about $10^5$, and typically $5\times10^5$, $10^6$ or more.

It will be appreciated by those of skill in the art that variations on the above procedures, or different procedures entirely, may also yield polymers of suitable quality for use in the invention.

After the polymer has been prepared, it can be used to form films or membranes by any convenient technique known in the art. We prepared our membranes by solution casting or coating. One unusual feature of the polymers used in the invention, and of PMP in particular, is their chemical resistance. The Masuda et al. review article, page 140, teaches that suitable solvents for polymerization are aromatic hydrocarbons, particularly toluene, because "they are good solvents for both catalyst and polymer".

This may be true for the low-molecular weight variants of the polymers made by Masuda et al.; however we found that polymers prepared according to our techniques are insoluble in aromatic hydrocarbons. Aromatic hydrocarbons are suitable as solvents for the polymerization reaction, but, as the polymer forms, the reaction mixture turns rapidly to a viscous gel. When we exposed samples of our polymers to aromatic solvents, the samples swelled but did not dissolve, even after two weeks of continuous exposure. Conversely, the Masuda et al. article states that aliphatic hydrocarbons, such as cyclohexane, have a lesser ability to dissolve substituted acetylene polymers. On the other hand, the only solvents that we have so far found to be capable of fully dissolving PMP are cyclohexane, methylcyclohexane and carbon tetrachloride.

Resistance to chemical attack is a feature that distinguishes the membranes of the invention from PTMSP membranes, for example. As is shown in the examples section, PTMSP is soluble in multiple straight-chain hydrocarbons, aromatic hydrocarbons and chlorinated hydrocarbons. Conversely, we found PMP to be insoluble in the straight-chain hydrocarbons and aromatic hydrocarbons that we tried, and to be insoluble in all chlorinated hydrocarbons that we tried except carbon tetrachloride. This is an advantageous property, in that it enables membranes manufactured from these materials to withstand harsh environments of use, and renders them workable in situations where PTMSP membranes, for example, might lose performance or be subject to catastrophic failure. This aspect of the invention is discussed in more detail as it relates to specific processes below.

Although chemical resistance is valuable, it limits the choice of processing solvents for membrane preparation. As mentioned above, to date we have found only three solvents for our polymers, and therefore recommend the use of one of these for membrane making. Those of skill in the art will appreciate that other solvents might exist, and, if identified, could be used.

To our knowledge, most of the physical properties of the defined polymers had never been measured previously. After we had discovered how to make the materials in high molecular weight forms and to solution-cast films, we were able to further investigate the physical properties of the new materials. We found that they exhibit low density, such as about 0.8 g/cm³, and high free volume, such as at least about 0.2, 0.25 or 0.3 expressed on a fractional basis. For example, based on the density measurements, we calculated the fractional free volume of PMP to be about 0.28. We believe that all of the polymers within our definition have fractional free volumes above about 0.2.

We then used the films to carry out permeation experiments with pure gases. As a result, we discovered that the polymers exhibit generally high gas permeabilities, such as an oxygen permeability of at least about 500 Barrer, a methane permeability of at least about 500 Barrer and an n-butane permeability of at least about 2,500 Barrer. For example, our measured permeability of our PMP polymer to a representative number of gases at 25° C. is listed below:

| | |
|---|---|
| Oxygen | 2,700 Barrer |
| Nitrogen | 1,330 Barrer |
| Hydrogen | 5,800 Barrer |
| Methane | 2,900 Barrer |
| Propane | 4,700 Barrer |
| n-Butane | 40,300 Barrer. |

These permeabilities are several orders of magnitude higher than in conventional, low-free-volume glassy polymers. For example, the corresponding permeability of polysulfone to oxygen is about 1 Barrer. In fact, these permeabilities are believed to be the highest known of any purely hydrocarbon-based polymer, and are exceeded only by those of two other substituted polyacetylenes, poly (trimethylsilylpropyne) [PTMSP] and poly (trimethylgermylpropyne) [PTMGP].

The calculated pure-gas selectivities, based on the measured permeabilities, are generally low. For example, the calculated oxygen/nitrogen selectivity is about 2, as is the calculated methane/nitrogen selectivity.

In general, therefore, the permeation properties of the new materials were found to be qualitatively similar to those of PTMSP and PTMGP. On the other hand, the permeation properties were found to be dissimilar from those of another polyacetylene, poly(tertbutylacetylene) [PTBA]. For example, the reported permeability of PTBA to oxygen is 130 Barrer (about 20 times lower than our measured PMP permeability), and to nitrogen is 43 Barrer (about 30 times lower than our measured PMP permeability). However, PMP and PTBA are both purely hydrocarbon based, and are therefore structurally much closer than are PMP and PTMSP.

We believe that the defined polymers will be useful in several aspects in the field of separation membranes. In keeping with the diverse uses, the membranes of the invention may take diverse forms. Because the polymers are glassy and rigid, an unsupported film, tube or fiber of the polymer may be usable as a single-layer membrane. In this case, our preferred method of manufacture is to prepare a solution of the polymer in one of the solvents mentioned above and to cast the solution onto a glass plate or a removable or non-removable backing web, according to general casting procedures that are well known in the art. The resulting flat-sheet membrane films may be dried under ambient conditions, at elevated temperature, or under vacuum as desired to produce thin film membranes. Alternatively, the membrane may be manufactured in the form of hollow fibers, the general methods for preparation of which are copiously described in the literature, for example in U.S. Pat. No. 3,798,185 to Skiens et al., incorporated herein by reference.

As an alternative to a homogeneous film, the membrane may be prepared in the form of an integral asymmetric membrane, comprising a dense region that forms the separation membrane and a microporous support region. Such membranes were originally developed by Loeb and Sourirajan, and their preparation in flat sheet or hollow fiber form is now conventional in the art and is described, for example, in U.S. Pat. Nos. 3,133,132 to Loeb, and 4,230,463 to Henis and Tripodi.

As a further alternative, the membrane may be a composite membrane, that is, a membrane having multiple layers. Modern composite membranes typically comprise a highly permeable but relatively unselective support membrane, which provides mechanical strength, coated with a thin selective layer of another material that is primarily responsible for the separation properties. As will be discussed below, the polymers used in the invention provide useful separation capabilities for a number of gas, vapor and liquid separations. Thus, the membranes of the invention may comprise a support membrane of any suitable material onto which a selective layer comprising one of the above-defined substituted polyacetylenes is coated.

Typically, but not necessarily, such a composite membrane is made by solution-casting the support membrane, then solution-coating the selective layer. General preparation techniques for making composite membranes of this type are well known, and are described, for example, in U.S. Pat. No. 4,243,701 to Riley et al., incorporated herein by reference. Again, the membrane may take flat-sheet, tube or hollow-fiber form. The most preferred support membranes are those with an asymmetric structure, which provides a smooth, comparatively dense surface on which to coat the selective layer. Support membranes are themselves frequently cast onto a backing web of paper or fabric. As an alternative to coating onto a support membrane, it is also possible to make a composite membrane by solution-casting the polymer directly onto a non-removable backing web, as mentioned above.

As already stated, the polymers used in the invention exhibit high permeability to most gases. Therefore, it is also possible to make useful membranes that comprise a support layer of the defined substituted acetylene, onto which is coated a less permeable, but more selective, separating layer. In this case, the properties of the above-defined polymers are used to provide a comparatively low-resistance support.

Yet other membrane configurations are possible. Another attractive option for making use of the properties of the above-defined polymers is as a gutter layer, that is, an intermediate layer between the support and selective layers of a membrane. The purpose of such an intermediate layer can be two-fold. The first purpose is to coat the support with a material that seals small defects in the support surface, and itself provides a smooth, essentially defect-free surface onto which the selective layer may be .coated. The second, and the primary purpose of a gutter layer, is to provide a layer of highly permeable material that can channel permeating molecules to the relatively widely spaced pores in the support layer. Layers comprising the defined substituted acetylenes are well suited to perform both sealing and gutter functions.

Following from this, yet another use is as a sealing layer on the top surface of the selective membrane layer. The glassy nature and high permeability of the materials render them valuable in this regard also.

From the above, it may be seen that useful ways to incorporate the new higher molecular weight forms of the polymers into membranes are many and varied. Other uses than those specifically described above will likely suggest themselves to those of skill in the art. For example, some of the uses described above may be combined. The scope of the invention is not limited to any particular membrane configuration, but covers separation membranes of any and all compositions, structures or geometries that incorporate one layer, and optionally more than one layer, comprising one of our defined disubstituted polyacetylenes.

The thickness of the membranes can be chosen according to the proposed use and may vary from 0.1 μm or less to hundreds of microns.

Once formed, the membranes of the invention may be used in any appropriate type of separation device. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise. For use, the membrane modules may be assembled in one-stage or multi-stage arrangements as needed to meet processing capacity.

It is anticipated that the membranes of the invention will be useful in a number of separation applications. Thus, in another aspect, the invention is a process for separating a component from a fluid mixture.

In its most basic embodiment, the invention in this aspect comprises:
(a) bringing the fluid mixture containing the component to be separated into contact with a feed side of a separation membrane, Comprising a polymer having repeating units of the formula:

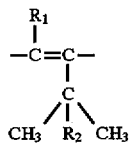

wherein $R_1$ is chosen from the group consisting of $C_1$–$C_4$ alkyl and phenyl, and wherein $R_2$ is chosen from the group consisting of hydrogen and phenyl;
(b) providing a driving force for transmembrane permeation; and
(c) withdrawing from the permeate side of the membrane a second fluid mixture in which the proportion of the component is enriched compared with the original fluid mixture.

The driving force for permeation across the membrane is generally provided by providing a pressure difference between the feed and permeate sides. This can be generated in a variety of ways, such as by compressing the feed stream, by drawing a vacuum on the permeate side of the membrane, by condensing the permeate stream, or by combinations of these. Sometimes the stream to be treated may already be at a high enough superatmospheric pressure to provide adequate transmembrane driving force without additional compression on the feed side or lowering of pressure on the permeate side.

The fluids on the feed and permeate sides may be gases or liquids. If both fluids are gases, then the process is gas separation, and includes the following steps:

(a) bringing a gas mixture containing a component to be separated into contact with the feed side of a separation membrane, said separation membrane comprising a polymer having repeating units of the formula:

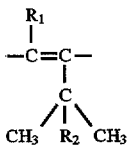

wherein $R_1$ is chosen from the group consisting of $C_1$–$C_4$ alkyl and phenyl, and wherein $R_2$ is chosen from the group consisting of hydrogen and phenyl;

(b) providing a driving force for transmembrane permeation;

(c) withdrawing from the permeate side of the membrane a gas that is enriched in the component to be separated compared with the original gas mixture.

Membranes that comprise the defined polymers as the selective layer exhibit generally high pure gas permeabilities and low selectivities calculated from pure gas measurements. As reported in the Examples section below, we found that the measured mixed-gas selectivity for mixtures of condensable and non-condensable gases, such as hydrocarbons and air, nitrogen or hydrogen, or more condensable and less condensable gases, such as propane and methane or butane and methane, is often better than the calculated ideal, or pure gas, selectivity. We suspect, therefore, that the polymers of the invention probably contain large, interconnected free-volume elements that give rise to a gas transport mechanism that is intermediate between solution/diffusion and pore flow. This mechanism is discussed in detail in co-owned pending application Ser. No. 08/608706, which is incorporated herein by reference. The free-volume elements may become blocked by sorption of the more condensable component, thereby reducing transport of the less condensable component and increasing selectivity.

In light of these properties, the membranes of the invention that comprise a selective layer of the defined polymers are useful for the following gas separation processes. This list is intended to be exemplary, not limiting:

(a) Separation of more condensable from less condensable gases. In this regard, the membranes of the invention are particularly useful for:

Separation of gases having boiling points at atmospheric pressure of −100° C. or above from those with lower boiling points Separation of gases having boiling points at atmospheric pressure of −50° C. or above from those with lower boiling points Separation of organic compound vapors, especially hydrocarbon vapors, from air or other gases Separation of mixtures of organic vapors, especially hydrocarbon vapors, of different boiling points Separation of components of natural gas streams, especially removal of $C_{2+}$ hydrocarbons Separation of components of petrochemical refining streams (b) Separation of low-boiling gases from one another, for example methane from nitrogen, in the presence of a condensable gas. This concept is explained in connection with previously discovered super-glassy materials in patent application Ser. No. 08/608706.

(c) Gas separations, of any gases, in which high throughput is very important, and modest selectivity is acceptable. As just one example, membrane separation may be used to perform a quick, bulk separation of a mixture, in conjunction with other separations operating on the residue or permeate streams to provide higher purity products.

(d) Separations in which the selectivity of the membrane can be enhanced, as discussed further below.

At present, the most preferred process for which the new membranes are useful is the recovery of natural gas liquids (NGL), which are liquid hydrocarbon mixtures typically containing varying amounts of propane, butane and heavier hydrocarbons. Natural gas is the most important fuel gas in the United States, and is also used extensively as a basic raw material in the petrochemical and other chemical process industries. The composition of natural gas varies widely from field to field. Streams that contain relatively large proportions, such as 10% or more, of ethane, propane, butane, or other $C_{2+}$ hydrocarbons, or combinations of these, are not uncommon, as are streams containing heavier straight-chain and aromatic hydrocarbons, such as hexane and benzene.

For safety reasons, the Btu rating of natural gas that is to be carried through a pipeline is usually controlled within a fairly narrow range, typically 950–1,050 Btu/cubic foot. Because of the higher Btu values of ethane, propane, butane and pentane, natural gases that contain significant proportions of these are too high in Btu value to be fed directly to a pipeline, or for direct use as commercial or domestic fuels. Equally importantly, the $C_{2+}$ hydrocarbons are of too much industrial value in their own right to be essentially wasted as secondary components in the gas mixture. It is, therefore, almost always necessary to subject raw natural gas to a treatment process of some kind for removal of $C_{2+}$ components of all kinds.

The membranes of the invention are more permeable to the $C_{2+}$ components than to methane. The $C_{2+}$ gases and vapors permeate preferentially through the membrane to form a $C_{2+}$ enriched permeate stream. The permeate stream can be at least partially condensed to recover an NGL fraction or subjected to further processing. Depending on the composition of the raw gas, and the process parameters, the process may be tailored to a variety of NGL recovery opportunities. Some specific, non-limiting, examples include:

Dewpoint control. Natural gas must typically must have a specific hydrocarbon dewpoint to eliminate condensation of hydrocarbon liquids in the pipeline or to meet sales specifications. The process of the invention can remove the propane and heavier hydrocarbons, thereby reducing the hydrocarbon dewpoint to the required level.

Btu control to meet pipeline specification, or to treat gas for use in the gas field as fuel for engines, turbines or other equipment.

NGL recovery from associated gases from oil wells. It is possible to use the process of the invention to remove propane and heavier components from associated gases. Recovered components may optionally be added to the crude oil from the production separators. In this way valuable hydrocarbons that would otherwise be lost may be recovered.

NGL recovery from gases generated during enhanced oil recovery (EOR). Nitrogen or carbon dioxide flooding is used to recover incremental oil from partially depleted oil fields. When the oil is produced, large volumes of associated gases containing correspondingly large quantities of the flood gas are generated. These gases are compressed for reinjection, and must be subjected to complex and costly processing steps if the valuable hydrocarbon component is to be recovered. The process of the invention offers a simple, economic treatment alternative.

NGL recovery from refinery gases or off gases from the petrochemical industry. Gas streams from these sources contain hydrogen in addition to propane and heavier hydrocarbons. The present invention can be used to remove propane and the heavier hydrocarbon components, leaving a higher purity hydrogen retentate, and a permeate that can be processed to produce an NGL product.

Pretreatment of hydrocarbon-laden gas streams to remove NGL components that may damage other types of membranes, such as cellulose acetate membranes, used during natural gas treatment.

In all of these NGL-recovery types of processes, the membranes of the invention offer some specific advantages. In the first place, they have useful mixed-gas selectivity, such as at least about 5 for n-butane over methane, more typically about 7 and frequently about 10 or more, depending on the butane activity in the feed and other factors. In the second place, they exhibit high transmembrane gas flux, in other words, large amounts of gas can be processed per unit area of membrane used. And, very importantly, they resist dissolution by most of the hydrocarbon components typically found in raw natural gas. This is valuable, since it enables the membranes to withstand feeds saturated with aromatic components, plant upsets that might bring the membranes into contact with hydrocarbon liquids, and other similarly challenging situations. In such circumstances, the membranes of the invention are superior to PTMSP membranes, which would be susceptible to attack and damage.

If homopolymers having the structures defined at the beginning of this Detailed Description section are relied on entirely for the separation properties, the membranes of the invention are not of any particular value in separating oxygen and nitrogen, for example, because existing membranes can achieve much higher selectivity.

However, various techniques for modifying polymer and membrane properties are known, such as blending or copolymerizing with other polymers; introducing additives, such as plasticizers or stabilizing agents, during membrane formation or thereafter; crosslinking; and surface treatments of the formed membrane, including, but not limited to, fluorination. Applicants have not yet carried out any such specific modifications, but, based on the body of art that is available derailing such techniques as applied to other glassy polymers and membranes, it is believed that they could be carried out without undue experimentation, and that at least some of these techniques will yield membranes of higher selectivity or otherwise usefully modified properties.

Thus the scope of the invention includes membranes that comprise copolymers of any form with the defined polymers, membranes that incorporate other polymers or other additives, and membranes that have been subjected to property modifying treatments of all kinds, as well as processes using those membranes.

So far, the discussion of gas separation processes has been limited to those in which the selective portion of the membrane contains the defined polymers. As was explained when describing the membrane aspects of the invention, membranes may also incorporate the defined polymers as a support, a gutter layer, or a sealing or protective layer, for example. In this regard, the process of the invention can be applied to any gas separations to help achieve an overall high transmembrane flux.

In a second exemplary process aspect, the process of the invention can be pervaporation. In this case, the feed fluid is liquid and the permeate fluid is in the gas phase. The process of the invention then includes the following steps:

(a) bringing a liquid mixture containing a component to be separated into contact with the feed side of a separation membrane, said separation membrane comprising a polymer having repeating units of the formula:

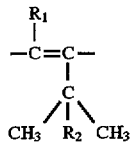

wherein $R_1$ is chosen from the group consisting of $C_1$–$C_4$ alkyl and phenyl, and wherein $R_2$ is chosen from the group consisting of hydrogen and phenyl;

(b) providing a driving force for transmembrane permeation;

(c) withdrawing from the permeate side of the membrane a gas that is enriched in the component to be separated compared with the original gas mixture.

In the case of pervaporation, the driving force for transmembrane permeation may often be conveniently provided, at last in part, by subjecting the permeate stream to condensation, thereby lowering the vapor pressure on the permeate side.

Pervaporation is used industrially to remove water from organic liquids, such as dehydration of alcohols, and is beginning to be used to remove organic compounds from water, such as waste water, process water or groundwater. Much work has also been done at the research level on separation of organic liquids from one another, such as to separate close-boiling liquids or to break azeotropes.

The membranes of the invention that comprise a selective layer of the defined polymers are useful for the following pervaporation processes. This list is intended to be exemplary, not limiting:

(a) Separation of organic compounds from water. In this regard, the membranes of the invention are particularly useful for:

Removal of hydrocarbons such as benzene, toluene and xylene from process and waste waters.

Removal of chlorinated solvents from process and waste waters.

Recovery of flavors and essences in the food processing industry.

Treatment of polluted groundwater to remove volatile organics.

Treatment of organic-containing condensate waters from various sources.

(b) Separation of mixed organic components, particularly those having close boiling points or forming azeotropes.

In these processes, the chemical resistance of the membranes is again particularly valuable.

As with gas separation, the membranes of the invention are also useful in processes that deploy their high permeability to perform support, sealing or gutter functions, combined with another material to provide the selective properties. The pervaporation processes of the invention may be carried out with membranes that comprise copolymers or additives, or have been modified in some way to enhance their properties. In pervaporation, the processes of the invention involve exposure of the membranes to liquids. In this regard, the ability of the membranes to resist attack or dissolution by organic solvents is particularly advantageous.

The invention is now illustrated in further detail by specific examples. These examples are intended to further clarify the invention, and are not intended to limit the scope in any way.

EXAMPLES

Example 1 Polymer Synthesis

The monomer, 4-methyl-2-pentyne (Lancaster Synthesis Co., Windham, N.J.), was dried over calcium hydride. A catalyst solution was prepared by dissolving 0.66 g of niobium pentachloride ($NbCl_5$) in 54 ml toluene and stirred for 10 minutes at 100° C. under dry nitrogen. A monomer solution of 5 g 4-methyl-2-pentyne in 7 ml toluene was added dropwise to the catalyst solution. This mixture was reacted for one hour at 100° C. The resulting gel was precipitated in methanol, filtered to recover the precipitated polymer, and dried under vacuum. The polymer was dissolved in carbon tetrachloride, and reprecipitated twice from methanol to remove excess monomer, oligomers, and excess catalysts. The yield was approximately 88%.

Example 2 Polymer Synthesis

The monomer, 4-methyl-2-pentyne, was dried over calcium hydride. A catalyst solution was prepared by dissolving 0.66 g of niobium pentachloride ($NbCl_5$) and 1.07 g of triphenyl bismuth ($Ph_3Bi$) in 54 ml toluene and stirred for 10 minutes at 90° C. under dry nitrogen. A monomer solution of 5 g 4-methyl-2-pentyne in 7 ml toluene was added dropwise to the catalyst solution. This mixture was reacted for one hour at 90° C. The resulting gel was precipitated in methanol, filtered to recover the precipitated polymer, and dried under vacuum. The polymer was dissolved in carbon tetrachloride, and reprecipitated twice from methanol to remove excess monomer, oligomers, and excess catalysts. The yield was approximately 70%.

Example 3 Polymer Film Preparation

The polymers prepared in Examples 1 and 2 were dissolved in carbon tetrachloride (2 wt % solution), and cast onto glass plates with a doctor blade. The resulting films were dried at ambient conditions for 24 hours, then dried under vacuum for three days to completely remove the solvent. The films were 20–40 µm (±0.5 µm) thick, as determined with a precision micrometer.

Example 4 Determination of Polymer Density

Polymer films were prepared as in Example 3, except that the resulting films were 250 µm thick. Three films samples were weighed on an analytical balance and the density determined from the known area and thickness of the films, as determined with a precision micrometer. The density of the PMP was 0.78±0.05 g/cm³.

Example 5 Determination of Polymer Free Volume

Fractional free volume (FFV) [free volume/cm³ polymer] is commonly used as a measure for the free volume potentially available for gas permeation and for chain packing of polymers. The fractional free volume is defined as:

$$FFV = v_{sp} - v_0 = v_{sp} - 1.3 v_w / v_{sp}$$

where $v_{sp}$ is the specific volume (cm³/g) of the polymer as determined from density measurements, and $v_0$ is the zero-point volume at 0° K. The zero-point volume was obtained from the relationship $v_0 = 1.3 \, v_w / v_{sp}$, where $v_w$ is the van der Waals volume, which was obtained by summing the volumes of the molecular units that make up the polymer, according to the group contribution method of Bondi. The resulting calculated fractional free volume of PMP was 0.28.

Example 6 Polymer Solubility

PMP film samples were immersed in potential solvent liquids in small glass vials. The vials were held at room temperature, 25° C., for two weeks. The results are shown in Table 1. Table 1 also includes some solubility data for PTMSP that were obtained from a personal communication from Air Products.

TABLE 1

| Liquid | Dissolves PMP? | Dissolves PTMSP? |
|---|---|---|
| Hexane | No | Yes |
| n-Heptane | No | No data obtained |
| Isooctane | No | No data obtained |
| Dodecane | No | Yes |
| Carbon tetrachloride | Yes | Yes |
| Benzene | No | Yes |
| Toluene | No | Yes |
| o-Xylene | No | Yes |
| Cyclohexane | Yes | No data obtained |
| Methylcyclohexane | Yes | No data obtained |
| Trichloroethylene | No | Yes |
| 1,1,1-trichloroethane | No | No data obtained |
| Chloroform | No | No |
| Ethyl acetate | No | No |
| Tetrahydrofuran | No | No |
| Methylene chloride | No | No |
| Acetone | No | No |
| n-n-Dimethylformamide | No | No |
| 2-propanol | No | No |
| Methanol | No | No |

Examples 7–9 Pure-Gas Permeation Properties of Poly(4-methyl-2-pentyne) [PMP]

Example 7

Experiments were carried out to determine the pure-gas permeation properties of the polymer prepared in Example 1. Polymer films were prepared as in Example 3. Samples of the membrane were cut into stamps and mounted in a permeation test-cell apparatus. The permeation of pure nitrogen was measured at a feed temperature of 50 psig and a permeate pressure of 0 psig. The temperature was maintained at 25° C. Volumetric gas flow rates were determined by soap-bubble flowmeters. The test was repeated using pure oxygen, methane, hydrogen, and carbon dioxide. The permeabilities are shown in Table 2.

TABLE 2

| Film # | Thickness (µm) | Permeability (Barrer) | | | | |
|---|---|---|---|---|---|---|
| | | Nitrogen | Oxygen | Methane | Hydrogen | Carbon Dioxide |
| 1 | 20 | 1,210 | 2,420 | 2,740 | 5,100 | 9,720 |
| 2 | 21.5 | 1,190 | 2,370 | 2,650 | 5,010 | 9,630 |

Example 8

Based on the pure-gas permeabilities measured in Example 7, the selectivities of the gases over nitrogen were calculated. The results are shown in Table 3.

TABLE 3

| Film # | Selectivity | | | |
|---|---|---|---|---|
| | Oxygen/ Nitrogen | Methane/ Nitrogen | Hydrogen/ Nitrogen | Carbon Dioxide/ Nitrogen |
| 1 | 2.0 | 2.3 | 4.2 | 8.0 |
| 2 | 2.0 | 2.2 | 4.2 | 8.1 |

Example 9 Pure-Gas Selectivities of PMP

Experiments were carried out to determine the pure-gas permeation properties of the polymer prepared in Example 2. A polymer film was prepared as in Example 3, and was subjected to permeation tests as in Example 7. The feed pressure was maintained at 50 psig for nitrogen, oxygen, methane, helium, hydrogen, carbon dioxide, and ethane. The feed pressures for propane and n-butane were 30 and 17 psig, respectively. The measured permeabilities and the calculated selectivities of the gases over nitrogen are shown in Table 4.

TABLE 4

| Gas | Permeability (Barrer) | Gas/Nitrogen Selectivity |
|---|---|---|
| Nitrogen | 1,330 | — |
| Helium | 2,630 | 2.0 |
| Oxygen | 2,700 | 2.0 |
| Hydrogen | 5,800 | 4.3 |
| Carbon Dioxide | 10,700 | 8.0 |
| Methane | 2,900 | 2.2 |
| Ethane | 3,700 | 2.8 |
| Propane | 4,700 | 3.5 |
| n-Butane | 40,300 | 30 |

It is noteworthy that the selectivities of hydrocarbons over nitrogen in PMP increase as the condensability and size of the hydrocarbons increase. This behavior is atypical for glassy polymers in general and indicates that PMP behaves as a super-glassy material. Typically, glassy polymers are selective for nitrogen over hydrocarbons because the polymers are size-selective. Thus, the selectivity in PMP must be dominated by a high solubility selectivity and a low diffusivity selectivity.

Example 10 Effect of Feed Pressure on Pure Gas Permeation Properties of PMP

An experiment was carried out to determine the permeability of the polymer at different feed pressures. Polymer from Example 2 was made into films as in Example 3, which were subjected to permeation tests as in Example 7. The test gases were nitrogen, carbon dioxide, methane, ethane, propane, and n-butane. The feed pressure was varied between 10 and 150 psig; the permeate-side pressure was atmospheric (0 psig). The feed temperature was 35° C. The results are shown in FIG. 1.

The permeabilities of nitrogen, carbon dioxide, methane, and ethane are essentially independent of feed pressure. However, the permeabilities of the more condensable gases, propane and n-butane, increase as the feed pressure increases. The propane permeability increased 2.2-fold, from 3,100 Barrer at 4 psig to 6,900 Barrer at 100 psig. The n-butane permeability increased 1.7-fold, from 11,700 Barrer at 4 psig to 23,700 Barrer at 17.4 psig.

Example 11 Effect of Feed Temperature on Pure Gas Permeation Properties

Figure 2:
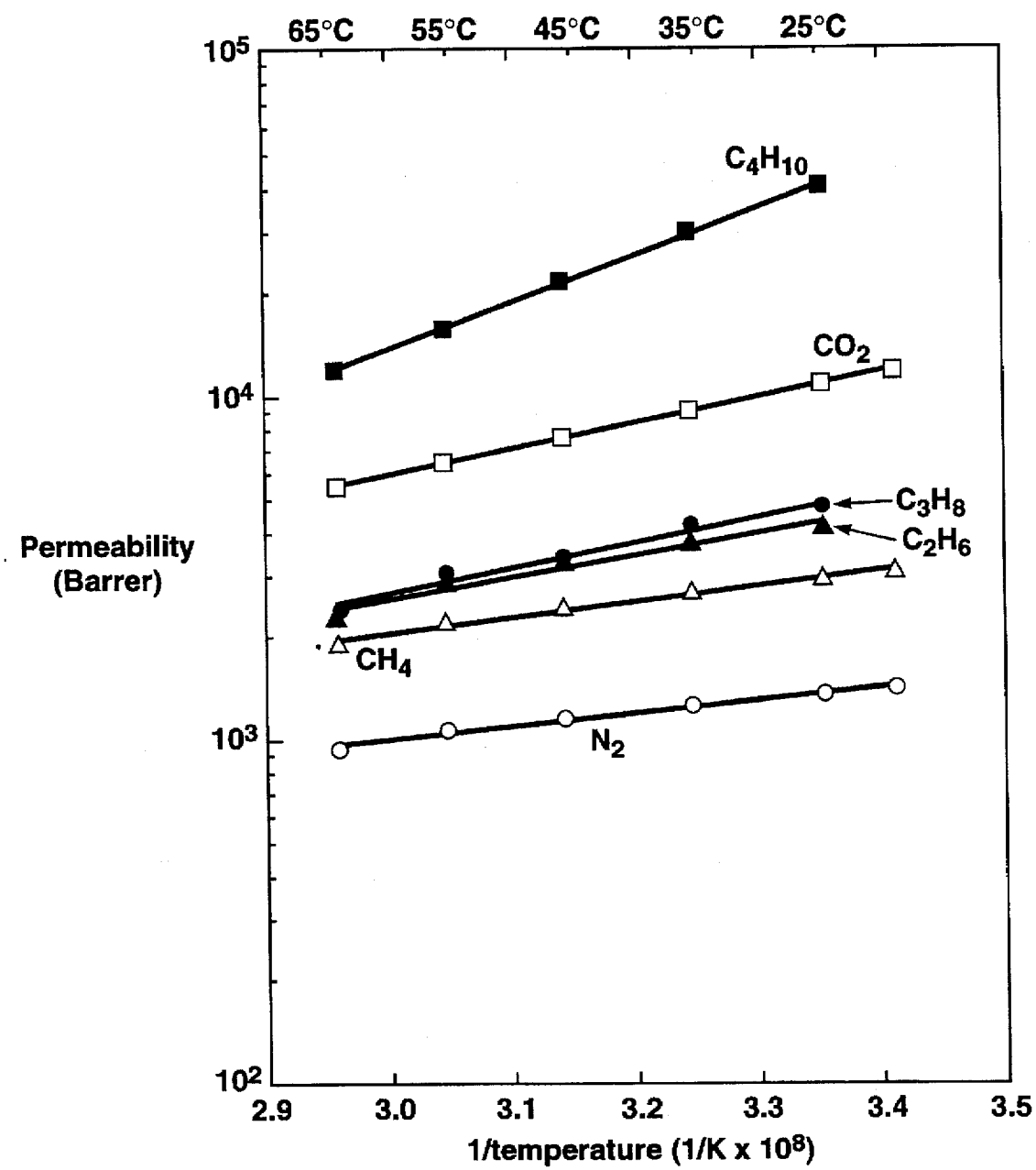
FIG. 2 is a graph of permeability of PMP to various gases as an inverse function of feed gas temperature.

An experiment was carried out to determine the permeability of the polymer at different feed temperatures. Polymer from Example 2 was made into films as in Example 3, which were subjected to permeation tests as in Example 7. The test gases were nitrogen, carbon dioxide, methane, ethane, propane, and n-butane. The feed temperature was varied from 20° to 65° C. The feed pressure was maintained at 50 psig for all the gases except propane and n-butane, which were tested at 30 and 10 psig, respectively. The results are shown in FIG. 2.

The permeabilities for all the gases increased with decreasing temperature. For permanent gases such as nitrogen and hydrogen, this behavior is unexpected for a glassy polymer.

Example 12 Mixed Gas Permeation Properties: Ethane/Hydrogen

An experiment was carried out to determine the mixed gas permeation properties of PMP films. Polymer prepared as in Example 2 was made into films according to the technique of Example 3. The thickness of the finished film was about 46 μm. Mixed gas permeation tests were carried out according to the general procedure of Example 7, using a mixture of 10 vol % ethane, 90 vol % hydrogen. The experiment was run at a feed pressure of 250 psig, a permeate pressure of 0 psig and at room temperature (23° C.). The pressure-normalized fluxes of the gases and the selectivity were calculated. The results were as follows:

Pressure-normalized ethane flux: $8.2 \times 10^{-5}$ cm$^3$(STP)/cm$^2$.s.cmHg

Pressure-normalized hydrogen flux: $5.1 \times 10^{-5}$ cm$^3$(STP)/cm$^2$.s.cmHg Ethane/hydrogen selectivity: 1.6

In contrast, the pure gas data of Table 4 indicate that the material would have an ethane/hydrogen selectivity of less than 1, that is, would be hydrogen selective.

Example 13 Mixed Gas Permeation Properties: Propane/Hydrogen

An experiment was carried out to determine the mixed gas permeation properties of PMP films. Polymer prepared as in Example 2 was made into films according to the technique of Example 3. The thickness of the finished film was about 46 μm. Mixed gas permeation tests were carried out according to the general procedure of Example 7, using a mixture of 10 vol % propane, 90 vol % hydrogen. The experiment was run at a feed pressure of 250 psig, a permeate pressure of 0 psig and at room temperature (23° C.). The pressure-normalized fluxes of the gases and the selectivity were calculated. The results were as follows:

Pressure-normalized propane flux: $8.5 \times 10^{-5}$ cm$^3$(STP)/cm$^2$.s.cmHg Pressure-normalized hydrogen flux: $1.9 \times 10^{-5}$ cm$^3$(STP)/cm$^2$.s.cmHg Propane/hydrogen selectivity: 4.4

In contrast, the pure gas data of Table 4 indicate that the material would have a propane/hydrogen selectivity of less than 1, that is, would be hydrogen selective. Also, the hydrogen flux is significantly lower in the propane/hydrogen mixture than in the ethane/hydrogen mixture.

Example 14 Mixed Gas Permeation Properties: n-Butane/Hydrogen

An experiment was carried out to determine the mixed gas permeation properties of PMP films. Polymer prepared as in Example 2 was made into films according to the technique of Example 3. The thickness of the finished film was about 46 μm. Mixed gas permeation tests were carried out according to the general procedure of Example 7, using a mixture of 2 vol % n-butane, 98 vol % hydrogen. The experiment was run at a feed pressure of 250 psig, a permeate pressure of 0 psig and at room temperature (23° C.). The pressure-normalized fluxes of the gases and the selectivity were calculated. The results were as follows:

Pressure-normalized n-butane flux: $16.6 \times 10^{-5}$ cm$^3$(STP)/ cm$^2$.s.cmHg
Pressure-normalized hydrogen flux: $2.2 \times 10^{-5}$ cm$^3$(STP)/ cm$^2$.s.cmHg
n-Butane/hydrogen selectivity: 7.4

This value is slightly higher than the calculated value from the pure gas data of Table 4.

Example 15 Mixed Gas Permeation Properties of PMP. Effect of Butane Activity.

Figure 3:
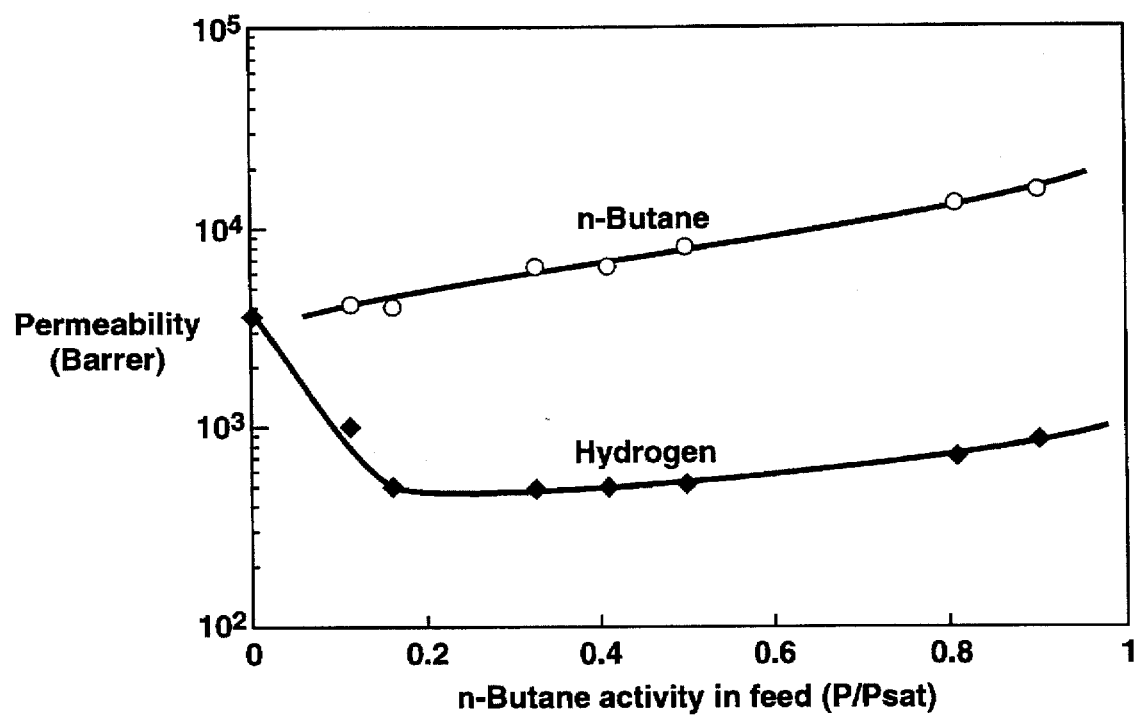
FIG. 3 is a graph of permeability of PMP to n-butane and hydrogen in a gas mixture as a function of n-butane activity in the mixture.

An experiment was carried out to determine the mixed-gas permeation properties of PMP polymer films. Polymer from Example 2 was made into films as in Example 3, which were subjected to permeation tests as in Example 7, except that the feed pressure was 250 psig. The concentration of n-butane in the mixture was varied to determine the effect of vapor activity on the mixed-gas permeation properties of PMP. The results are shown in FIG. 3.

The hydrogen permeability decreased sharply with increasing n-butane activity, especially in the range 0–0.2. At higher n-butane activities, the hydrogen permeability increased slightly. The n-butane permeability increased about fourfold over the 0.1–0.9 activity range, from about 4,140 Barrer to about 15,000 Barrer.

Example 16 Mixed-Gas Selectivity of PMP. Effect of Butane Activity.

Figure 4:
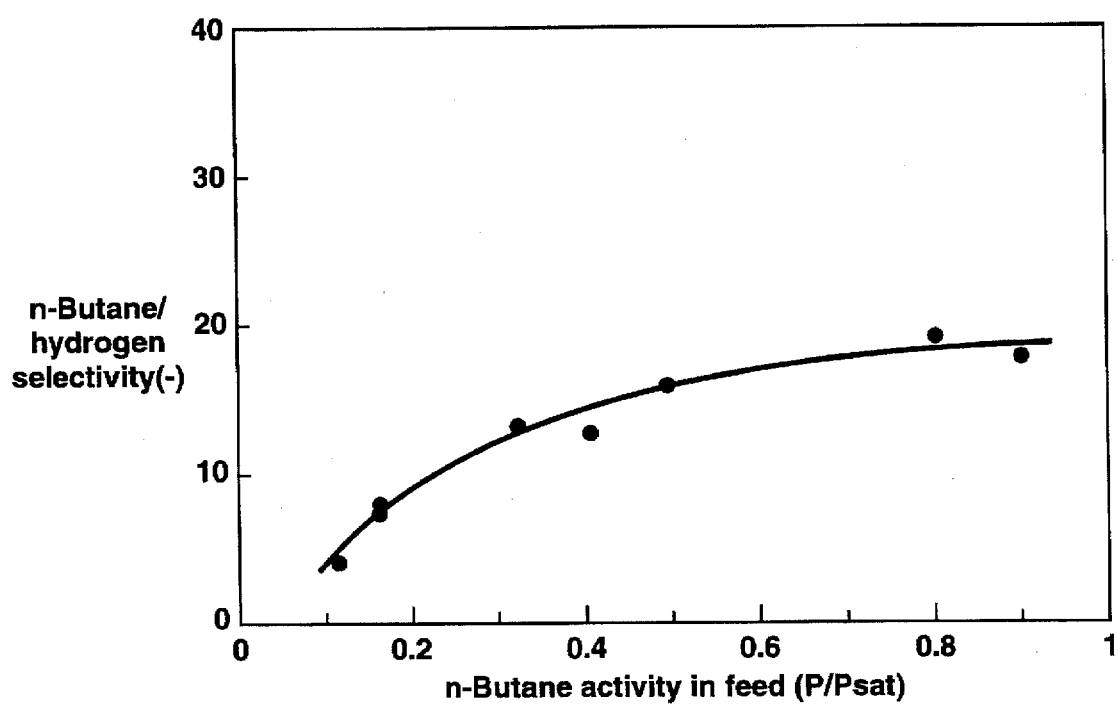
FIG. 4 is a graph of PMP mixed-gas n-butane/hydrogen selectivity as a function of n-butane activity in the mixture.

Based on the permeabilities measured in Example 15, the n-butane/hydrogen selectivity was calculated. The results are shown in FIG. 4.

The n-butane/hydrogen selectivity increased about fourfold, from 4 to 16, over the n-butane activity range 0.1–0.5. Thereafter, the selectivity increased only slightly to 18 at 0.9 n-butane activity.

Example 17 Mixed Gas Permeation Properties. Hydrocarbon Binary Mixture

An experiment was carried out to determine the mixed hydrocarbon permeation properties of PMP films. Polymer prepared as in Example 2 was made into films according to the technique of Example 3. The thickness of the finished film was about 30 μm. Mixed gas permeation tests were carried out according to the general procedure of Example 7, using a mixture of 1.85 vol % n-butane in methane. At the time that the permeation tests were carried out, the membrane film was over six months old. The film was exposed to pure n-butane for about 30 minutes before running the permeation tests. The experiment was run at a feed pressure of 250 psig, a permeate pressure of 0 psig and at room temperature (23° C.). The pressure-normalized fluxes of the gases and the selectivity were calculated. The results were as follows:

Pressure-normalized n-butane flux: $11.0 \times 10^{-5}$ cm$^3$(STP)/ cm$^2$.s.cmHg
Pressure-normalized methane flux: $1.3 \times 10^{-5}$ cm$^3$(STP)/ cm$^2$.s.cmHg
n-Butane/methane selectivity: 8.5

The experiment was repeated with a mixture of 9.2 vol % n-butane in methane. The results were as follows:
Pressure-normalized n-butane flux: $30.0 \times 10^{-5}$ cm$^3$(STP)/ cm$^2$.s.cmHg
Pressure-normalized methane flux: $1.9 \times 10^{-5}$ cm$^3$(STP)/ cm$^2$.s.cmHg
n-Butane/methane selectivity: 15.8

Example 18 Mixed Gas Permeation Properties. Hydrocarbon Binary Mixture

An experiment was carried out as in Example 17, but using a different membrane stamp cut from the same film. The results were as follows:
(a) n-butane content of test gas: 1.85 vol %
Pressure-normalized n-butane flux: $17.5 \times 10^{-5}$ cm$^3$(STP)/ cm$^2$.s.cmHg
Pressure-normalized methane flux: $1.7 \times 10^{-5}$ cm$^3$(STP)/ cm$^2$.s.cmHg
n-Butane/methane selectivity: 10.3
(b) n-butane content of test gas: 9.5 vol %
Pressure-normalized n-butane flux: $34.1 \times 10^{-5}$ cm$^3$(STP)/ cm$^2$.s.cmHg
Pressure-normalized methane flux: $2.4 \times 10^{-5}$ cm$^3$(STP)/ cm$^2$.s.cmHg
n-Butane/methane selectivity: 14.2

Example 19 Mixed Gas Permeation Properties. Synthetic Lean NGL Mixture

An experiment was carried out to simulate the removal of NGL components from a natural gas stream. The feed gas composition was:
86 vol % methane
10 vol % ethane
3 vol % propane
1 vol % n-butane Polymer prepared as in Example 2 was made into films according to the technique of Example 3. Films of various thicknesses were made. Permeation tests were carried out according to the general procedure of Example 7, at a feed pressure of 250 psig, a permeate pressure of 0 psig and at room temperature (23° C.). The results are shown in Table 5.

TABLE 5

| Membrane thickness | Pressure-normalized flux ($10^{-5}$ cm$^3$ (STP)/cm$^2$ · s · cmHg) | | | | Selectivity over methane | | |
|---|---|---|---|---|---|---|---|
| (μm) | CH$_4$ | C$_2$H$_6$ | C$_3$H$_8$ | n-C$_4$H$_{10}$ | C$_2$H$_6$ | C$_3$H$_8$ | n-C$_4$H$_{10}$ |
| 43 | 1.5 | 3.5 | 5.8 | 16.0 | 2.3 | 3.8 | 10.8 |
| 41 | 2.3 | 5.4 | 9.0 | 25.0 | 2.3 | 3.9 | 10.7 |
| 9 | 7.3 | 18.0 | 31.0 | 79.0 | 2.5 | 4.3 | 10.8 |
| 17 | 2.7 | 7.0 | 13.0 | 37.0 | 2.6 | 4.7 | 13.8 |
| 10 | 5.9 | 15.0 | 25.0 | 71 | 2.5 | 4.3 | 11.9 |
| 5 | 3.3 | 7.9 | 13.0 | 33 | 2.4 | 3.8 | 10.2 |

Example 20 Composite PIMP Membrane Preparation

Thin-film composite membranes were prepared using PMP as the selective layer on a microporous support. The microporous support had a pressure-normalized flux of $1 \times 10^{-2}$ cm$^3$(STP)/cm$^2$.s.cmHg. A 1 wt % solution of PMP in cyclohexane was wick-coated onto the microporous support. The composite membranes were dried at 80° C. for six hours.

Example 21 Composite Membrane Permeation Properties

The PiMP composite membranes of Example 20 were subjected to pure-gas experiments as in Example 7. The pressure-normalized fluxes and calculated selectivities are shown in Table 6.

TABLE 6

| Sample # | Pressure-normalized flux (10$^{-6}$ cm$^3$ (STP)/cm$^2 \cdot$ s $\cdot$ cmHg) | | | | Selectivity | | |
|---|---|---|---|---|---|---|---|
| | Nitrogen | Oxygen | Methane | Carbon Dioxide | Oxygen/ Nitrogen | Methane/ Nitrogen | Carbon Dioxide/ Nitrogen |
| 1 | 930 | 2,000 | 1,900 | 7,400 | 2.1 | 2.0 | 8.0 |
| 2 | 480 | 1,200 | 990 | 4,800 | 2.5 | 2.1 | 10 |
| 3 | 770 | 1,700 | 1,500 | 6,600 | 2.2 | 1.9 | 9.0 |
| 4 | 670 | 1,400 | 1,300 | 5,500 | 2.1 | 1.9 | 8.0 |

The thin PMP composite membranes had selectivities over nitrogen substantially equal to those obtained with the thick isotropic films (Example 9). Thus, ultrathin, defect-free PMP composite membrane can be prepared.

Examples 22 and 23 Comparative examples not in accordance with the invention

Example 22

Poly(tertbutylacetylene) [PTBA], a purely hydrocarbon-based polyacetylene, is structurally related to PMP. The nitrogen permeability of PTBA reported by Masuda et al. [*Polymer* 29, 2041, (1988)] is 43 Barrer. This compares with nitrogen permeabilities of 1,190, 1,210 and 1,330 Barrer for the PMP samples of Examples 7 and 9. Thus PMP is about 30 times more permeable than PTBA to nitrogen.

Example 31

The oxygen permeability of PTBA reported by Masuda et al. [*Polymer* 29, 2041, (1988)] is 130 Barrer. This compares with a oxygen permeabilities of 2,370, 2,420 and 2,700 Barrer for the PMP samples of Examples 7 and 9. Thus PMP is about 20 times more permeable than PTBA to oxygen.

We claim:

1. A process for separating a component of a first fluid mixture comprising the steps of:
   (a) bringing said first fluid mixture into contact with a feed side of a separation membrane, said separation membrane comprising a polymer having repeating units of the formula:

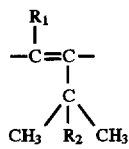

wherein R$_1$ is chosen from the group consisting of C$_1$–C$_4$ alkyl and phenyl, and wherein R$_2$ is chosen from the group consisting of hydrogen and phenyl, said polymer being characterized by an oxygen permeability at room temperature of at least about 500 Barrer;
   (b) providing a driving force for transmembrane permeation;
   (c) withdrawing from a permeate side of said separation membrane a second fluid mixture wherein said component is enriched, compared with said first fluid mixture.

2. The process of claim 1, wherein said first fluid mixture is gaseous.

3. The process of claim 1, wherein said first fluid mixture is liquid.

4. The process of claim 1, wherein said first fluid mixture is liquid and said second fluid mixture is gas.

5. The process of claim 1, wherein said component comprises a condensable component.

6. The process of claim 1, wherein said component comprises an organic compound.

7. The process of claim 1, wherein said component comprises a hydrocarbon.

8. The process of claim 1, wherein said component comprises a C$_{2+}$ hydrocarbon.

9. The process of claim 1, wherein said first fluid mixture comprises natural gas.

10. A gas separation process comprising the steps of:
    (a) bringing a gas mixture containing a component to be separated into contact with a feed side of a separation membrane, said separation membrane comprising a polymer having repeating units of the formula:

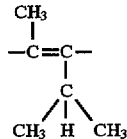

said polymer being characterized by an oxygen permeability at room temperature of at least about 500 Barrer:
    (b) providing a driving force for transmembrane permeation;
    (c) withdrawing from a permeate side of said separation membrane a gas that is enriched in said component compared with said gas mixture.

11. The process of claim 10, wherein said gas mixture comprises methane and said component comprises a C$_{2+}$ hydrocarbon.

12. A process for recovering natural gas liquid, comprising the steps of:
    (a) providing a membrane having a feed side and a permeate side; said membrane comprising a polymer having repeating units of the formula:

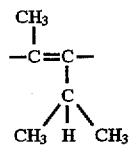

said polymer being characterized by an oxygen permeability at room temperature of at least about 500 Barrer;
    (b) passing a gas containing a C$_{2+}$ hydrocarbon across said feed side;

(c) withdrawing from said permeate side a permeate vapor stream enriched in said $C_{2+}$ hydrocarbon compared with said gas;

(d) condensing at least a portion of said permeate vapor stream to form said natural gas liquid.

13. A separation membrane comprising a polymer having repeating units of the formula:

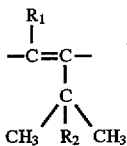

wherein $R_1$ is chosen from the group consisting of $C_1$–$C_4$ alkyl and phenyl, and wherein $R_2$ is chosen from the group consisting of hydrogen and phenyl, said polymer being characterized by an oxygen permeability at room temperature of at least about 500 Barrer.

14. The polymer of claim 13, wherein $R_1$ is methyl.

15. The polymer of claim 13, wherein $R_2$ is hydrogen.

16. The membrane of claim 13, wherein said polymer is 4-methyl-2-pentyne.

17. The membrane of claim 13, wherein said polymer is a copolymer.

18. The membrane of claim 13, wherein said membrane comprises a film of said polymer.

19. The membrane of claim 13, wherein said membrane comprises a support layer and a selective layer coating said support layer.

20. The membrane of claim 19, wherein said support layer comprises said polymer.

21. The membrane of claim 19, wherein said selective layer comprises said polymer.

22. The membrane of claim 19, wherein said membrane comprises a support layer and a selective layer coating said support layer, and wherein said support layer is microporous.

23. The membrane of claim 13, wherein said membrane comprises an integral asymmetric membrane.

24. The membrane of claim 13, wherein said membrane comprises a laminate having at least two layers, at least one of said layers comprising said polymer.

25. The membrane of claim 13, wherein said membrane comprises a laminate having at least three layers, at least one of said layers comprising said polymer.

26. The membrane of claim 13, wherein said membrane comprises a sealing layer, said sealing layer comprising said polymer.

27. The membrane of claim 13, wherein said membrane comprises a gutter layer, said gutter layer comprising said polymer.

28. The membrane of claim 13, wherein said polymer has a molecular weight of at least about $10^5$.

29. The membrane of claim 13, wherein said polymer has a molecular weight of at least about $10^6$.

30. The membrane of claim 13, wherein said polymer has a fractional free volume of at least about 0.2.

31. The membrane of claim 13, wherein said polymer has a fractional free volume of at least about 0.25.

32. The membrane of claim 13, wherein said polymer is characterized by a methane permeability at room temperature of at least about 500 Barrer.

33. The membrane of claim 13, wherein said polymer is characterized by an n-butane permeability at room temperature of at least about 2,500 Barrer.

34. The membrane of claim 13, wherein said membrane exhibits a mixed gas selectivity for n-butane over methane of at least about 5.

35. The membrane of claim 13, wherein said membrane is prepared from a solution of said polymer in a solvent chosen from the group consisting of cyclohexane, methylcyclohexane and carbon tetrachloride.

* * * * *